US012694037B2

(12) United States Patent
Boyangu

(10) Patent No.: US 12,694,037 B2
(45) Date of Patent: **\*Jul. 28, 2026**

(54) SYSTEM AND METHOD FOR PARTITIONING DATA BASED ON AUTHORIZATION RULES

(71) Applicant: Sisense Ltd., Ramat Gan (IL)

(72) Inventor: Guy Boyangu, Tel Aviv (IL)

(73) Assignee: Sisense Ltd., Ramat Gan (IL)

( \* ) Notice: Subject to any disclaimer, the term of this patent is extended or adjusted under 35 U.S.C. 154(b) by 0 days.

This patent is subject to a terminal disclaimer.

(21) Appl. No.: 17/661,501

(22) Filed: Apr. 29, 2022

(65) Prior Publication Data

US 2022/0261412 A1 Aug. 18, 2022

Related U.S. Application Data

(63) Continuation of application No. 16/695,474, filed on Nov. 26, 2019, now Pat. No. 11,354,330.

(60) Provisional application No. 62/779,815, filed on Dec. 14, 2018.

(51) Int. Cl.
*G06F 16/25* (2019.01)
*G06F 16/23* (2019.01)

(52) U.S. Cl.
CPC ........ *G06F 16/254* (2019.01); *G06F 16/2379* (2019.01)

(58) Field of Classification Search
None
See application file for complete search history.

(56) References Cited

U.S. PATENT DOCUMENTS

| | | | |
|---|---|---|---|
| 7,340,447 B2 | 3/2008 | Ghatare | |
| 7,814,076 B2 | 10/2010 | Sack et al. | |
| 8,321,438 B1 | 11/2012 | Smith et al. | |
| 8,645,423 B2 \* | 2/2014 | Thuringer | G06F 16/22 |
| | | | 707/781 |
| 9,049,195 B2 | 6/2015 | Sack et al. | |
| 9,330,140 B1 | 5/2016 | Bogrett | |
| 9,501,585 B1 \* | 11/2016 | Gautam | G06F 16/3328 |
| 9,584,439 B2 | 2/2017 | Leafe et al. | |
| 2016/0019132 A1 \* | 1/2016 | Vilakkumadathil | |
| | | | G06F 11/3612 |
| | | | 717/126 |
| 2016/0104002 A1 | 4/2016 | Schneider et al. | |
| 2017/0132401 A1 \* | 5/2017 | Gopi | G06F 21/6227 |
| 2017/0161344 A1 | 6/2017 | Vasireddy | |
| 2017/0344607 A1 | 11/2017 | Cho et al. | |
| 2017/0371926 A1 | 12/2017 | Shiran et al. | |
| 2018/0150529 A1 | 5/2018 | McPherson et al. | |

(Continued)

*Primary Examiner* — Richard L Bowen
(74) *Attorney, Agent, or Firm* — M&B IP Analysts, LLC

(57) ABSTRACT

A system and method for partitioning data based on authorization rules. The method includes initiating a plurality of data nodes, each data node including a dataset generated based on a shared data model, wherein each of the plurality of data nodes corresponds to at least one authorization rule, wherein each authorization rule authorizes at least one user identifier to access a respective data node of the plurality of data nodes; and configuring an extract, transform, and load (ETL) application service to extract data from a data source and to load data from the data source to the dataset stored on a first data node of the plurality of data nodes when the at least one first authorization rule authorizes a requesting user to access the first data node.

17 Claims, 5 Drawing Sheets

(56) References Cited

U.S. PATENT DOCUMENTS

| 2018/0173774 | A1* | 6/2018 | Mcpherson | ........... G06F 16/258 |
| 2020/0084049 | A1 | 3/2020 | Lindell et al. | |

* cited by examiner

SYSTEM AND METHOD FOR PARTITIONING DATA BASED ON AUTHORIZATION RULES

CROSS-REFERENCE TO RELATED APPLICATIONS

This application is a continuation of U.S. Non-Provisional application Ser. No. 16/695,474 filed on Nov. 26, 2019, now allowed, which claims the benefit of U.S. Provisional Application No. 62/779,815 filed on Dec. 14, 2018, the contents of which are hereby incorporated by reference.

TECHNICAL FIELD

The present disclosure relates generally to distributed services, and particularly to provisioning storage of distributed storage systems.

BACKGROUND

For many organizations (particularly large organizations), using solutions to gain insights from their collected and generated data is beneficial. However, while the organization as a whole may share a common goal, some members or groups of members of the organization may be privy to information which others are not. To these members, data security is a priority.

Similarly, for organizations seeking to provision only a portion of their data to outside entities, data security is also a priority. For example, a business may keep records used to provide services to its clients as well as internal records that should remain private within the business, or may keep different records that are accessible to different clients. Thus, improving data security for a solution may lead to a higher likelihood of adoption of that solution.

One discipline concerned with gleaning insights from large data sets is known as business intelligence. Data may lack a rigorous structure or otherwise may require normalization, i.e., taking data from multiple data sources and transforming it into a uniform structure or format. For example, the same phone number may appear as "(555)-554-7113" or "+1-555-554-7113" in different data sources.

One process of producing a dataset from multiple data sources is known as extract, transform, load (ETL). Extracting data is the process of extracting data from data sources, data transformation is the process of transforming data into a single format or structure, and loading is the process where the transformed data is loaded into a target database, upon which queries and analytics may be performed.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for partitioning data based on authorization rules. The method comprises: initiating a plurality of data nodes, each data node including a dataset generated based on a shared data model, wherein each of the plurality of data nodes corresponds to at least one authorization rule, wherein each authorization rule authorizes at least one user identifier to access a respective data node of the plurality of data nodes; and configuring an extract, transform, and load (ETL) application service to extract data from a data source and to load data from the data source to the dataset stored on a first data node of the plurality of data nodes when the at least one first authorization rule authorizes a requesting user to access the first data node.

Certain embodiments disclosed herein also include a non-transitory computer readable medium having stored thereon causing a processing circuitry to execute a process, the process comprising: initiating a plurality of data nodes, each data node including a dataset generated based on a shared data model, wherein each of the plurality of data nodes corresponds to at least one authorization rule, wherein each authorization rule authorizes at least one user identifier to access a respective data node of the plurality of data nodes; and configuring an extract, transform, and load (ETL) application service to extract data from a data source and to load data from the data source to the dataset stored on a first data node of the plurality of data nodes when the at least one first authorization rule authorizes a requesting user to access the first data node.

Certain embodiments disclosed herein also include a system for partitioning data based on authorization rules. The system comprises: a processing circuitry; and a memory, the memory containing instructions that, when executed by the processing circuitry, configure the system to: initiate a plurality of data nodes, each data node including a dataset generated based on a shared data model, wherein each of the plurality of data nodes corresponds to at least one authorization rule, wherein each authorization rule authorizes at least one user identifier to access a respective data node of the plurality of data nodes; and configure an extract, transform, and load (ETL) application service to extract data from a data source and to load data from the data source to the dataset stored on a first data node of the plurality of data nodes when the at least one first authorization rule authorizes a requesting user to access the first data node.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
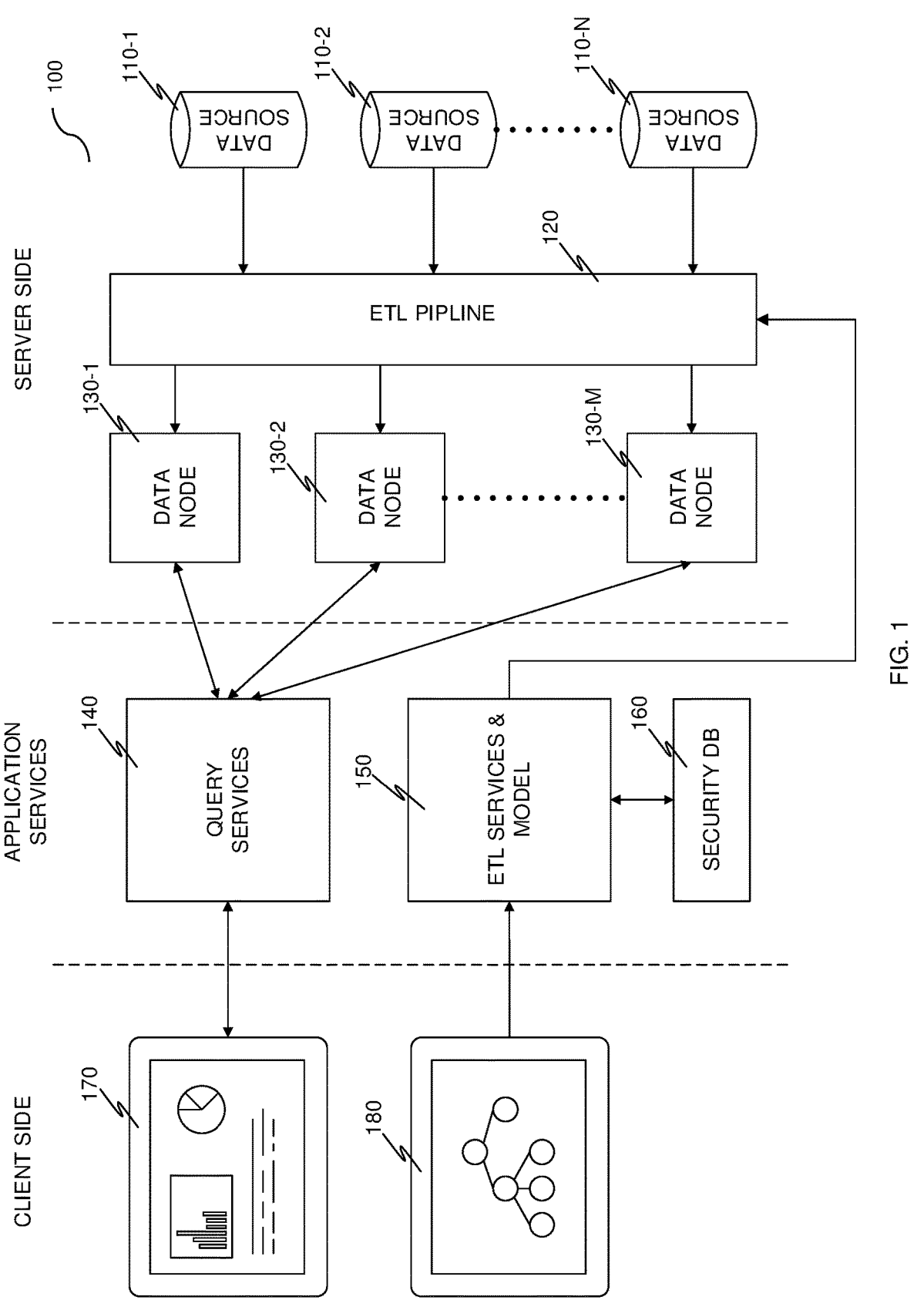
FIG. 1 is a flow diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for partitioning data based on authorization rules. Data nodes are initiated such that each data node corresponds to one or more authorization rules. The data nodes may be initiated, for example, in a cloud-based environment. The authorization rules authorize users (e.g., based on user identifiers) to access respective data nodes. The authorized users of each authorization rule may include a group of users. Datasets are generated based on a shared data model and stored on the data nodes. An extract, transform, and load (ETL) application service becomes configured to extract data from a data source and to load the extracted data to one of the data nodes when a user requesting data is authorized to access the data node.

In some implementations, an ETL pipeline may be established for each data node. Data is filtered through the ETL pipelines such that the filtered data is loaded to the dataset stored on data nodes corresponding to the ETL pipelines through which the data is filtered. New data may be continuously filtered through the ETL pipelines to determine which datasets data should be loaded to as the new data is received.

The disclosed embodiments provide techniques for partitioning data through use of data nodes and selective access during extract, transform, and load processing. Data is loaded based on authorization rules such that data is only loaded to data nodes associated with users having the proper authorization to view data.

In this regard, it has been identified that existing solutions may store all data together and use indicators for determining which portions of the data may be viewed by a particular user. This may add overhead due to requiring an additional column of data for storing index data. Additionally, each query according to this collective data store solution would require querying the entire dataset including rows upon rows of data which are inaccessible to the user. Thus, these existing solutions waste computing resources and leave open potential for exploiting security flaws.

The disclosed embodiments improve on existing solutions at least by providing an alternative partitioning method that partitions data at the ETL stage rather than at the query stage, thereby shortening query time. Additionally, each user's data is partitioned from other data in other data sources which the user is not authorized to view, thereby improving security by decreasing the likelihood that a user will be erroneously allowed to access unauthorized data.

Providing data nodes including datasets generated based on a shared data model also allows for users to have access to different respective datasets without requiring users to configure their own data models. That is, by generating a dataset including a subset of a shared data model for each user or group of users based on authorization rules, each user or group of users may be provided individualized access to data without needing to manually configure their own data models from scratch, for example, by manually selecting portions of data they are able to view and copying the portions of data into their respective datasets. New data may be automatically filtered and stored in respective datasets without requiring users to repeatedly check for data to manually add to their datasets.

FIG. 1 is a flow diagram 100 utilized to describe various disclosed embodiments. The flow diagram 100 illustrates a full stack system that may be utilized in accordance with the disclosed embodiments. The flow diagram 100 illustrates data sources 110-1 through 110-N (hereinafter referred to individually as a data source 110 or collectively as data sources 110), ETL pipelines 120, data nodes 130-1 through 130-M (hereinafter referred to individually as a data node 130 or collectively as data nodes 130), a query services application 140, an ETL application service (ETL services & model) 150, a security database (DB) 160, and client devices 170 and 180.

Each of the data sources 110 may be, but is not limited to, a data lake, a data warehouse, a database, a database table, a combination thereof, and the like. Data from the data sources 110 may be filtered through the ETL pipelines 120 such that the data is stored in respective data nodes of the data nodes 130.

Each of the client devices 170 and 180 may be, but is not limited to, a personal computing device such as a personal computer, laptop computer, smartphone, tablet computer, and the like. Each of the client device 170 and 180 has a user interface (not shown) for accepting user inputs related to requests for data, configuration of data models, or both. The client device 170 may further include a display for displaying data reports generated based on data from the data nodes 130, which may include graphical elements such as charts and graphs as well as textual elements such as tables.

Each ETL pipeline 120 may include, but is not limited to, the instructions, application programming interfaces (APIs), and the like for performing ETL operations. In accordance with the disclosed embodiments, the instructions included in each ETL pipeline 120 may include instructions for loading data into a corresponding data node 130. The ETL process may be performed based on a data model, i.e., a data structure into which data from one or more of the data sources 110 is loaded.

The data model may include certain tables columns, and rows, different format versions thereof, and the like. The data model may include instructions for executing ETL functions on, for example, one of the data sources 110. The instructions may include, for example, loading data into a new table which may be generated by the ETL application service 150. The client device 180 is configured to accept user inputs related to generating data models for the ETL application service 150.

The data model may be managed by the ETL application service 150. The ETL application service 150 may be realized, for example, as a server including a storage for storing one or more data models, and may run on-premises, in a cloud-based computing environment, or both.

The query services application 140 is configured to receive requests for data from a client device (e.g., the client device 170), to retrieve query results from the data nodes 130 based on the requests, and to send the query results (or content generated based on the query results) to the client device for display.

In this regard, each data node 130 is associated with one or more user identifiers and stores a dataset including data that its associated user identifiers are authorized to access. Thus, the query services application 140 is configured to retrieve data based on authorization rules defining such authorizations. More specifically, the query services application 140 queries each of the respective data nodes 130 that is associated with the user of the requesting client device.

Each of the data nodes 130 may be initiated in response to new authorization rules being stored in the security database 160. The initiated data node 130 corresponds to one or more user identifiers of users of client devices (e.g., the client device 170) which are authorized to access the data sources 110 or portions thereof from which data in the data node 130 is loaded. Accordingly, query time may be shortened by partitioning data at ETL execution rather than at query.

The query service 140 may periodically receive new or updated authorization rules from the security database 160. In some implementations, the query service 140 may request new rules from the security database 160. In response to receipt of new authorization rules, new data nodes 130 may be initiated, for example by a data node initiator (e.g., the data node initiator, FIG. 2).

In some embodiments, a relationship or operation may be defined between one or more datasets, such as defining a 'join' operation between two columns. In some embodiments, users are presented different data using the same model (i.e., a shared data model). This can be done for reasons of security (data partitioning). For example, a third party may wish to provide analytical information to two distinct clients. The party organizes data of both clients into the same data model, but must ensure that each client sees only data for which it is authorized. To this end, the datasets stored in the data nodes 130 may be generated on this shared data model. After the datasets are generated, they may continuously be loaded with new information filtered through the ETL pipelines 120. This may be referred to as a multi-tenant model, where each distinct client is a tenant having shared infrastructure (the data model) and private infrastructure (e.g., a specific data node).

It should be noted that the particular configuration shown in FIG. 1 is merely illustrative and that the disclosed embodiments are not limited to the particular arrangement shown in FIG. 1. As a non-limiting example, additional client devices, query services, and/or ETL application services may be utilized without departing from the scope of the disclosure.

Figure 2:
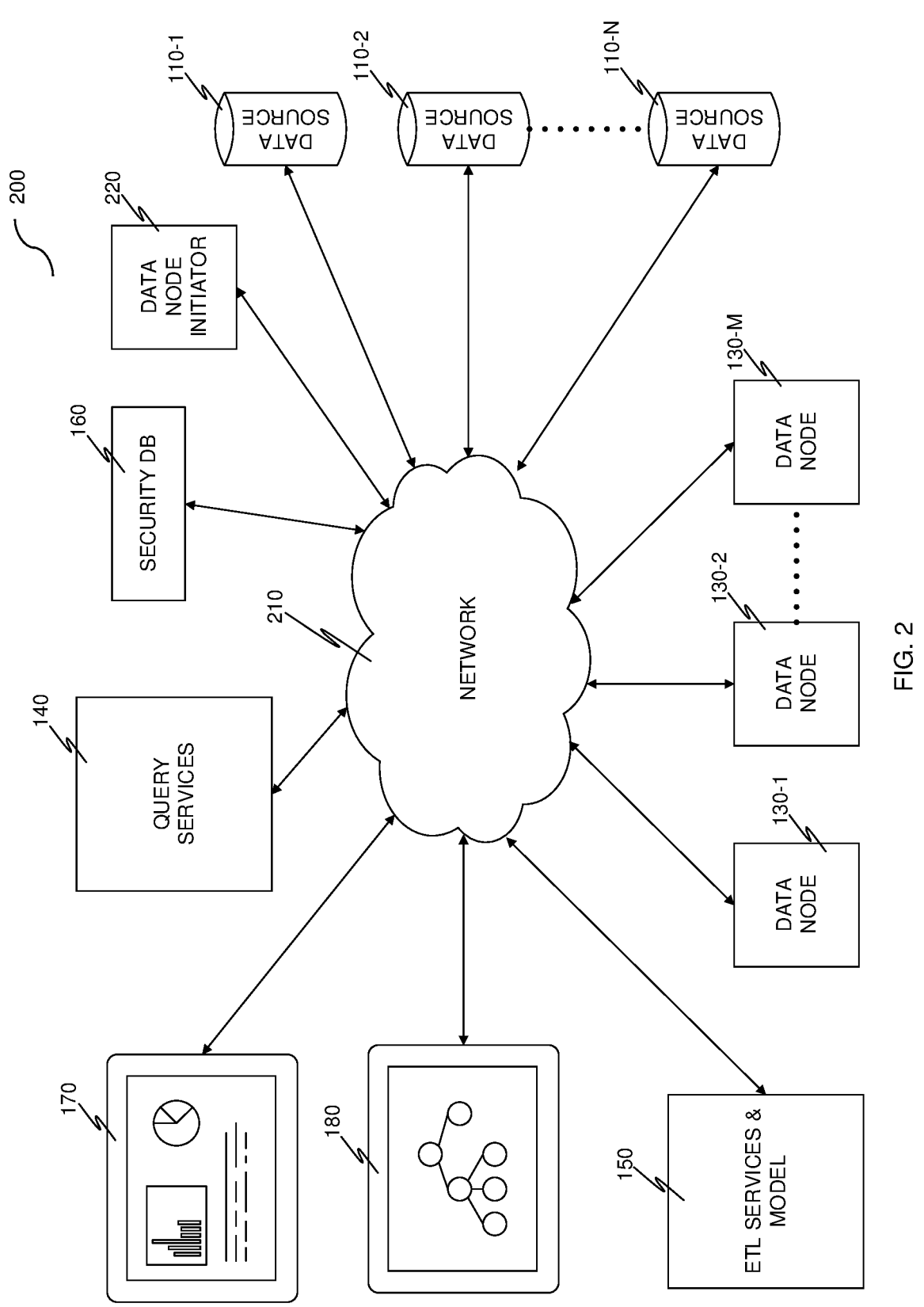
FIG. 2 is a network diagram utilized to describe various disclosed embodiments.

FIG. 2 is a network diagram 200 utilized to describe various disclosed embodiments. The network diagram 200 includes the data sources 110, the data nodes 130, the query services application 140, the ETL application service 150, the security database (DB) 160, the client devices 170 and 180, and a data node initiator 220 communicating via a network 210. The network 210 may be, but is not limited to, a wireless, cellular or wired network, a local area network (LAN), a wide area network (WAN), a metro area network (MAN), the Internet, the worldwide web (WWW), similar networks, and any combination thereof. The network 210 and any or all of the various elements shown in FIG. 2 may be deployed in, for example, a cloud-based computing environment. Some elements shown in FIG. 2 may be likewise implemented on-premises.

The data node initiator 220 is configured to initiate the data nodes 130 and to configure the ETL application service 150 in accordance with the disclosed embodiments. Initiating a data node may include, but is not limited to, initiating a new virtual machine in a hypervisor, initiating a new container in a container engine, initiating a new machine in a cloud-based computing environment, instructing an orchestrator (not shown) to initiate a new machine, connecting a data node with an ETL pipeline (e.g., one of the ETL pipelines 120, FIG. 1) and a query services application (e.g., the query services application 140, FIG. 1).

The data node initiator 220 initiates (or is instructed to initiate) the data nodes based on one or more authorization rules from the security database 160. For example, a first user may be authorized to access data from a first data source 110-1 while a second user is authorized to access data from a second data source 110-2. The data node initiator 220 may initiate the first data source 110-1 such that it corresponds to an authorized view by the first user and initiate the second data source 110-2 such that it corresponds to an authorized view by the second user.

Multiple users may access and be served by the same data node (e.g., the data node 130-1). In some implementations, a data node 130 serving multiple users or user devices may be implemented as a distributed system in order to offer load balancing. When a user, through a user device such as the client device 170, sends a query to the query services application 140, the query services application 140 directs the query to the relevant data node(s) 130. This can be performed, for example, by querying the security database 160 for authorization rules in order to determine which data node(s) 130 the user is authorized to access. Alternatively, the authorization rules may be stored locally to the query services application 140.

Figure 3:
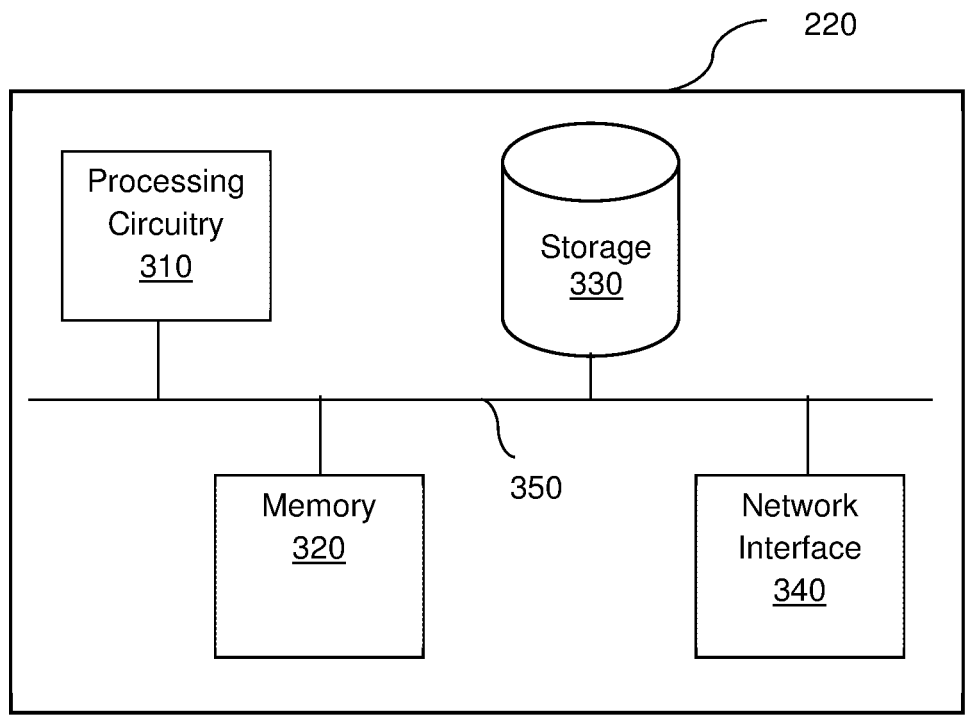
FIG. 3 is a schematic diagram of a data node initiator according to an embodiment.

FIG. 3 is a schematic diagram of the data node initiator 220 according to an embodiment. The data node initiator 220 includes a processing circuitry 310 coupled to a memory 320, a storage 330, and a network interface 340. In an embodiment, the components of the system 300 may be communicatively connected via a bus 350.

The processing circuitry 310 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 320 may be volatile (e.g., RAM, etc.), non-volatile (e.g., ROM, flash memory, etc.), or a combination thereof.

In one configuration, software for implementing one or more embodiments disclosed herein may be stored in the storage 330. In another configuration, the memory 320 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 310, cause the processing circuitry 310 to perform the various processes described herein.

The storage 330 may be magnetic storage, optical storage, and the like, and may be realized, for example, as flash memory or other memory technology, CD-ROM, Digital Versatile Disks (DVDs), or any other medium which can be used to store the desired information.

The network interface 340 allows the data node initiator 220 to communicate for purposes such as, but not limited to, receiving notifications of new authorization rules, initiating data nodes, configuring ETL services applications, and establishing ETL pipelines.

It should be understood that the embodiments described herein are not limited to the specific architecture illustrated in FIG. 3, and other architectures may be equally used without departing from the scope of the disclosed embodiments.

Figure 4:
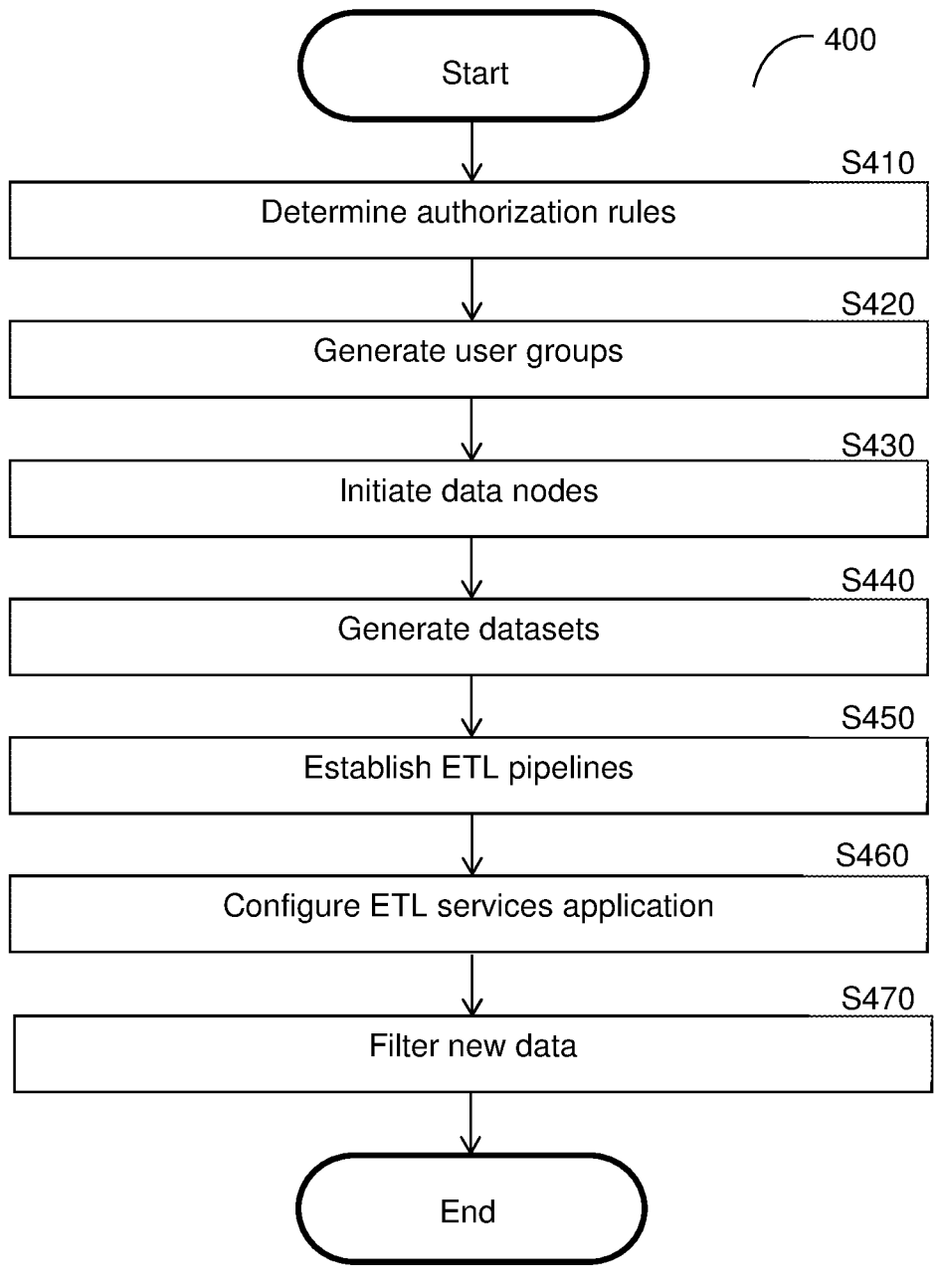
FIG. 4 is a flowchart illustrating a method for initiating a data node according to an embodiment.

FIG. 4 is a flowchart illustrating a method for initiating data nodes according to an embodiment. In an embodiment, the method is performed by the data node initiator 220, FIG. 2.

At S410, authorization rules are determined for user identifiers. Specifically, one or more authorization rules are determined for each user identifier. A user identifier may be, but is not limited to, a user device identifier (e.g., an Internet Protocol address, name, and MAC address), a user account name, an email address, a domain name, and the like.

The authorization rules may be included in a respective security policy for each of the user identifiers. The authorization rules indicate which datasets their respective user identifiers are authorized to view. The authorization rules may further indicate locations of data within a dataset or data source which user identifiers are authorized to view. As a non-limiting example, a first user account may be authorized to view rows 1 through 99 of a dataset, a second user account may be authorized to view rows 100 through 150 of the dataset, and a third administrator account may be authorized to view all rows of the dataset.

The authorization rules may be further defined with respect to keys within a database. As a non-limiting example, when a columnar database is used, the authorization rules may be linked to keys of tables of the columnar database. For example, certain transactions stored as rows in a table may include a first alphanumeric key "alpha1" and others include a second alphanumeric key "beta2". A first user identifier may be authorized to view any row having the alpha1 key, a second user identifier may be authorized to view any row having the beta2 key, and a third user identifier may be authorized to view any row of the table.

At optional S420, user groups may be generated. Each user group includes one or more user identifiers. Each user group corresponds to one or more authorization rules defining which datasets or portions thereof members of the user group are authorized to view. The user groups may be generated based on commonalities among the authorization rules. As a non-limiting example, a first user group may include all user identifiers including an email address having the domain "@company.com" and be authorized to view rows 1 through 99 of a database, while a second user group includes user identifiers "admin@company.com" and "guy@company.com" which are authorized to view rows 100 through 150 of the database.

At S430, one or more data nodes is initiated. Each data node is initiated for one or more user identifiers. Further, a data node may be initiated for each user group.

In an embodiment, initiating a data node includes loading an instance of the data node such as, but not limited to, loading a virtual machine in a hypervisor, loading a container in a container engine, orchestrating a machine in a cloud-based environment, and the like.

At S440, datasets are generated and stored in the initiated data nodes. In an embodiment, the datasets are initially generated based on a shared data model. The datasets may be subsequently loaded with incoming data that is filtered using ETL pipelines.

At optional S450, extract, transform, load (ETL) pipelines may be established. The established ETL pipelines correspond to respective data nodes such that each ETL pipeline filters a portion of incoming data to its respective data node based on the authorization rules.

In an embodiment, establishing an ETL pipeline includes configuring the ETL pipeline to load data based on the authorization rules of its respective data node such that only data that the user identifiers of the data node are authorized to view is loaded to the data node by the ETL pipeline.

At S460, an ETL services application is configured to extract data from data sources and load the extracted data into datasets of respective data nodes. Configuring the ETL services application may include, but is not limited to, sending instructions for extracting data from data sources into respective data nodes in accordance with the authorization rules.

At optional S470, new data is received and filtered through the ETL pipelines. The new data is filtered such that portions of the new data are selectively loaded to respective data nodes based on user authorization with respect to the new data.

It should be noted that the steps of FIG. 4 are described with respect to performance by the data node initiator 220, but that in some implementations at least a portion of the steps may be performed by another component. As a particular example, ETL pipelines may alternatively be established by an ETL services application (e.g., the ETL services application 150, FIG. 1).

Figure 5:
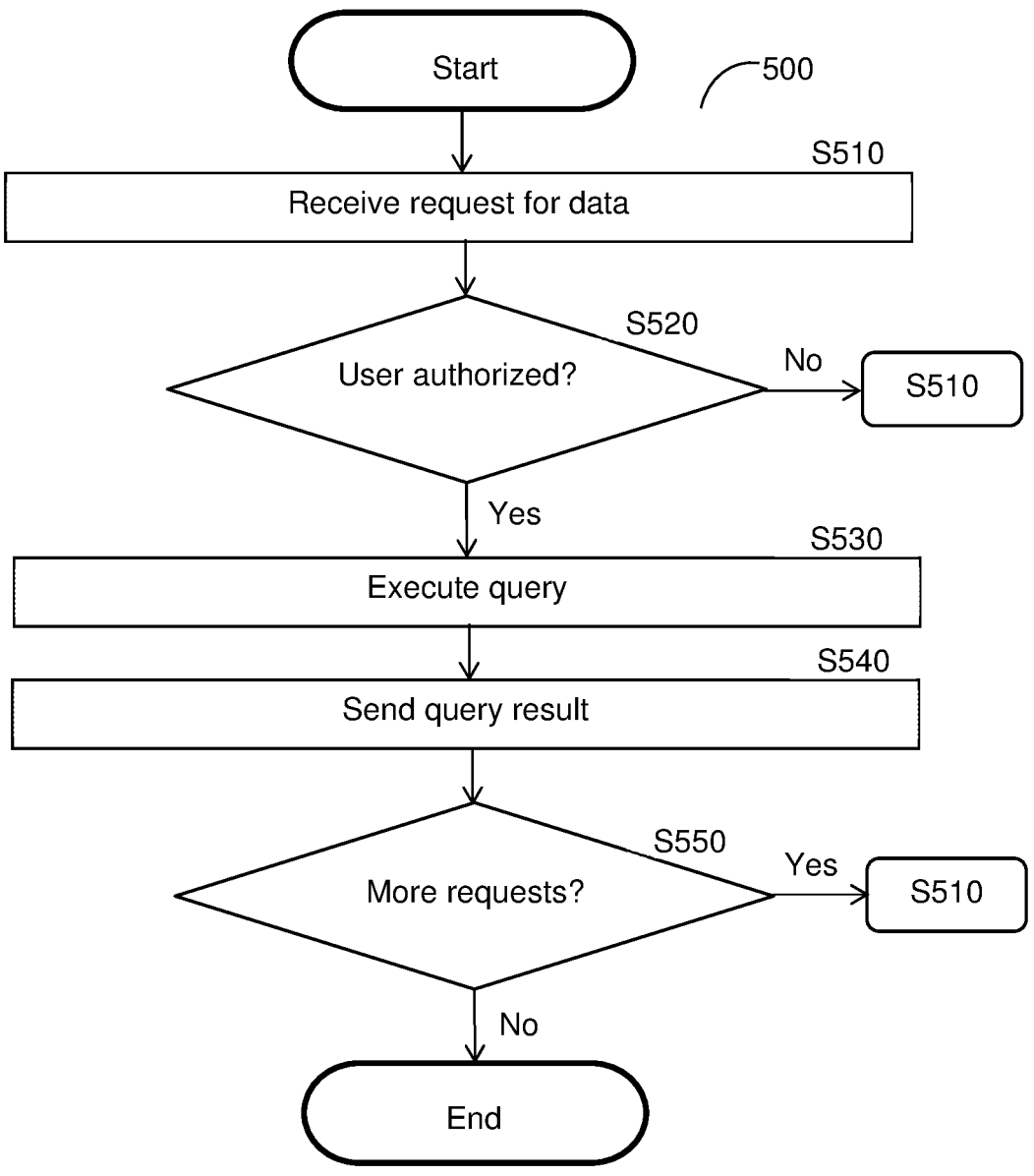
FIG. 5 is a flowchart illustrating a method for directing a query based on security rules according to an embodiment.

FIG. 5 is a flowchart illustrating a method for directing a query based on security rules according to an embodiment. In an embodiment, the method is performed by the query services application 140, FIG. 1.

At S510, a request for data is received. The request may be received, for example, from a client device, and includes an indication of the requested data. To this end, the request may include, but is not limited to, a query or an identifier of the location of the requested data.

At S520, it is determined if the requesting device is authorized to access the requested data or a portion thereof and, if so, execution continues with S530; otherwise, execution continues with S510. The determination may be based on authorization rules and a user identifier of the device that sent the request for data.

In an embodiment, S520 includes determining whether the requesting device is associated with a user identifier that is authorized to access a data node storing the requested data. Alternatively or collectively, authorization may be determined by accessing a portion of data (e.g., a table) which includes user identifiers with respective authorized datasets or by querying a security database to verify user access permissions.

In some embodiments, when S520 results in a "no" determination, execution may continue with generating a new data node (for example, as describe above with respect to FIG. 4). In a further embodiment, a notification may be sent to an administrator account in order to request approval of authorization of the requesting device to access the requested data. New authorization rules may be generated based on the newly granted authorization.

At S530, when it is determined that the requesting user is authorized to access the requested data, a query is executed on each data node the user is authorized to access. The query may include multiple sub-queries, each sub-query executed on a different dataset. The query is executed on one or more datasets, portions thereof, or both.

At S540, the query results are sent to the requesting device.

At S550, it is determined if more requests have been received and, if so, execution continues with S510; otherwise, execution terminates.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for partitioning data and answering a query, comprising:

initiating a plurality of data nodes that includes at least a first data node and a second data node, wherein the first data node corresponds to a first authorization rule, and the second data node corresponds to a second authorization rule, wherein the first authorization rule authorizes a first user identifier to access the first data node, and the second authorization rule authorizes a second user identifier to access the second data node; and prior to receiving a user request for data as part of a query, initially configuring an extract, transform, and load (ETL) application service to:

extract data from a data source;

load a first data from the data source to a first dataset stored on the first data node, based on the first authorization rule that authorizes a requesting user to access the first data node; and load a second data from the data source to a second dataset stored on the second data node based on the second authorization rule that authorizes a requesting user to access the second data node, wherein the first dataset and the second dataset are based on a shared data model;

establishing a plurality of ETL pipelines, each ETL pipeline corresponding to one of the plurality of data nodes, wherein data filtered through each of the ETL pipelines is loaded into a respective dataset stored on a one of the plurality of data nodes corresponding to the ETL pipeline;

receiving a request from a device for data from one of the first data node and the second data node, the request including one of the first user identifier and the second user identifier, the data being requested specified as a query, and an identifier of the one of the first data node and the second data node storing the requested data;

determining whether the requesting device is associated with one of the first user identifier and the second user identifier that is authorized to access the one of the first data node and the second data node storing the requested data;

when the requesting device is associated with one of the first user identifier and the second user identifier that is authorized to access the one of the first data node and the second data node storing the requested data, executing the query on at least the one of the first data node and the second data node storing the requested data; and transmitting results of the query to the requesting device.

2. The method of claim 1, wherein the data source is a first data source of a plurality of data sources, and wherein establishing the plurality of ETL pipelines further comprises:

extracting data from the plurality of data sources; and loading the extracted data to the dataset stored on the first data node based on the first authorization rule.

3. The method of claim 1, wherein each of the first authorization rule and the second authorization rule further authorizes a respective user identifier to access at least one location of data.

4. The method of claim 3, wherein each of the first authorization rule and the second authorization rule each defines a respective key, wherein the at least one location of data authorized by each of the first authorization rule and the second authorization rule stores the respective key defined in the corresponding authorization rule.

5. The method of claim 1, further comprising:

generating a plurality of user groups, wherein each of the plurality of user groups includes at least one user identifier corresponding to one of the authorization rules.

6. The method of claim 1, wherein a group of data nodes each correspond to the first authorization rule.

7. The method of claim 1, further comprising:

executing the query on both of the first data node and the second data when the received one of the first user identifier and the second user identifier is authorized to access both of the first data node and the second data.

8. The method of claim 1, wherein initiating a first data node includes cause an orchestrator to initiate a new machine in a cloud computing environment.

9. A non-transitory computer readable medium having stored thereon instructions for causing a processing circuitry to execute a process for partitioning data and answering a query, the process comprising:

initiating a plurality of data nodes that includes at least a first data node and a second data node, wherein the first data node corresponds to a first authorization rule, and the second data node corresponds to a second authorization rule, wherein the first authorization rule authorizes a first user identifier to access the first data node, and the second authorization rule authorizes a second user identifier to access the second data node; and prior to receiving a user request for data as part of a query, initially configuring an extract, transform, and load (ETL) application service to:

extract data from a data source;

load a first data from the data source to a first dataset stored on the first data node, based on the first authorization rule that authorizes a requesting user to access the first data node; and load a second data from the data source to a second dataset stored on the second data node based on the second authorization rule that authorizes a requesting user to access the second data node, wherein the first dataset and the second dataset are based on a shared data model;

establishing a plurality of ETL pipelines, each ETL pipeline corresponding to one of the plurality of data nodes, wherein data filtered through each of the ETL pipelines is loaded into a respective dataset stored on a one of the plurality of data nodes corresponding to the ETL pipeline;

receiving a request from a device for data from one of the first data node and the second data node, the request including one of the first user identifier and the second user identifier, the data being requested specified as a query, and an identifier of the one of the first data node and the second data node storing the requested data;

determining whether the requesting device is associated with one of the first user identifier and the second user identifier that is authorized to access the one of the first data node and the second data node storing the requested data;

when the requesting device is associated with one of the first user identifier and the second user identifier that is authorized to access the one of the first data node and the second data node storing the requested data, executing the query on at least the one of the first data node and the second data node storing the requested data; and transmitting results of the query to the requesting device.

10. A system for partitioning data based on authorization rules and answering a query, comprising:

a processing circuitry; and a memory, the memory containing instructions that, when executed by the processing circuitry, configure the system to:

initiate a plurality of data nodes that includes at least a first data node and a second data node, wherein the first data node corresponds to a first authorization rule, and the second data node corresponds to a second authorization rule, wherein the first authorization rule authorizes a first user identifier to access the first data node, and the second authorization rule authorizes a second user identifier to access the second data node; and prior to receiving a user request for data, configure an extract, transform, and load (ETL) application service to:

extract data from a data source;

load a first data from the data source to a first dataset stored on the first data node, based on the first authorization rule that authorizes a requesting user to access the first data node; and load a second data from the data source to a second dataset stored on the second data node based on the second authorization rule that authorizes a requesting user to access the second data node, wherein the first dataset and the second dataset are based on a shared data model;

establish a plurality of ETL pipelines, each ETL pipeline corresponding to one of the plurality of data nodes, wherein data filtered through each of the ETL pipelines is loaded into a respective dataset stored on a one of the plurality of data nodes corresponding to the ETL pipeline;

receive a request from a device for data from one of the first data node and the second data node, the request including one of the first user identifier and the second user identifier, the data being requested specified as a query, and an identifier of the one of the first data node and the second data node storing the requested data;

determine whether the requesting device is associated with one of the first user identifier and the second user identifier that is authorized to access the one of the first data node and the second data node storing the requested data;

when the requesting device is associated with one of the first user identifier and the second user identifier that is authorized to access the one of the first data node and the second data node storing the requested data, executing the query on at least the one of the first data node and the second data node storing the requested data; and transmitting results of the query to the requesting device.

11. The system of claim 10, wherein the data source is a first data source of a plurality of data sources, and wherein to establish the plurality of ETL pipelines the system is further configured to:

extract data from the plurality of data sources; and load the extracted data to the dataset stored on the first data node based on the first authorization rule.

12. The system of claim 10, wherein each of the first authorization rule and the second authorization rule further authorizes a respective user identifier to access at least one location of data.

13. The system of claim 12, wherein each of the first authorization rule and the second authorization rule each defines a respective key, wherein the at least one location of data authorized by each of the first authorization rule and the second authorization rule stores the respective key defined in the corresponding authorization rule.

14. The system of claim 10, wherein the system is further configured to:

generate a plurality of user groups, wherein each of the plurality of user groups includes at least one user identifier corresponding to one of the authorization rules.

15. The system of claim 10, wherein a group of data nodes each correspond to the first authorization rule.

16. The system of claim 10, wherein the system is further configured to:

execute the query on both of the first data node and the second data when the received one of the first user identifier and the second user identifier is authorized to access both of the first data node and the second data.

17. The system of claim 10, wherein to initiate a first data node the system is further configured to cause an orchestrator to initiate a new machine in a cloud computing environment.

* * * * *